Figure 20:
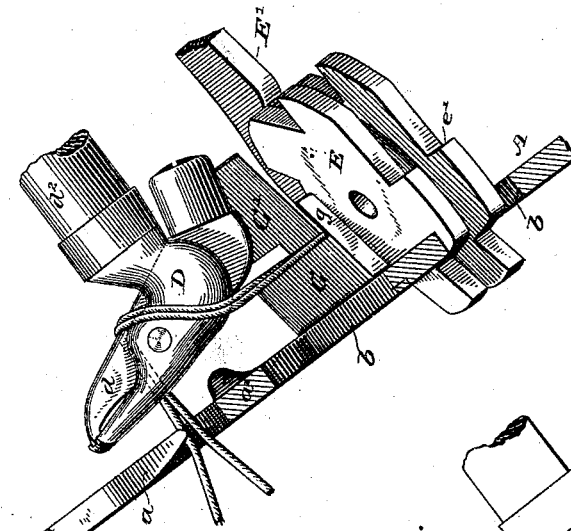

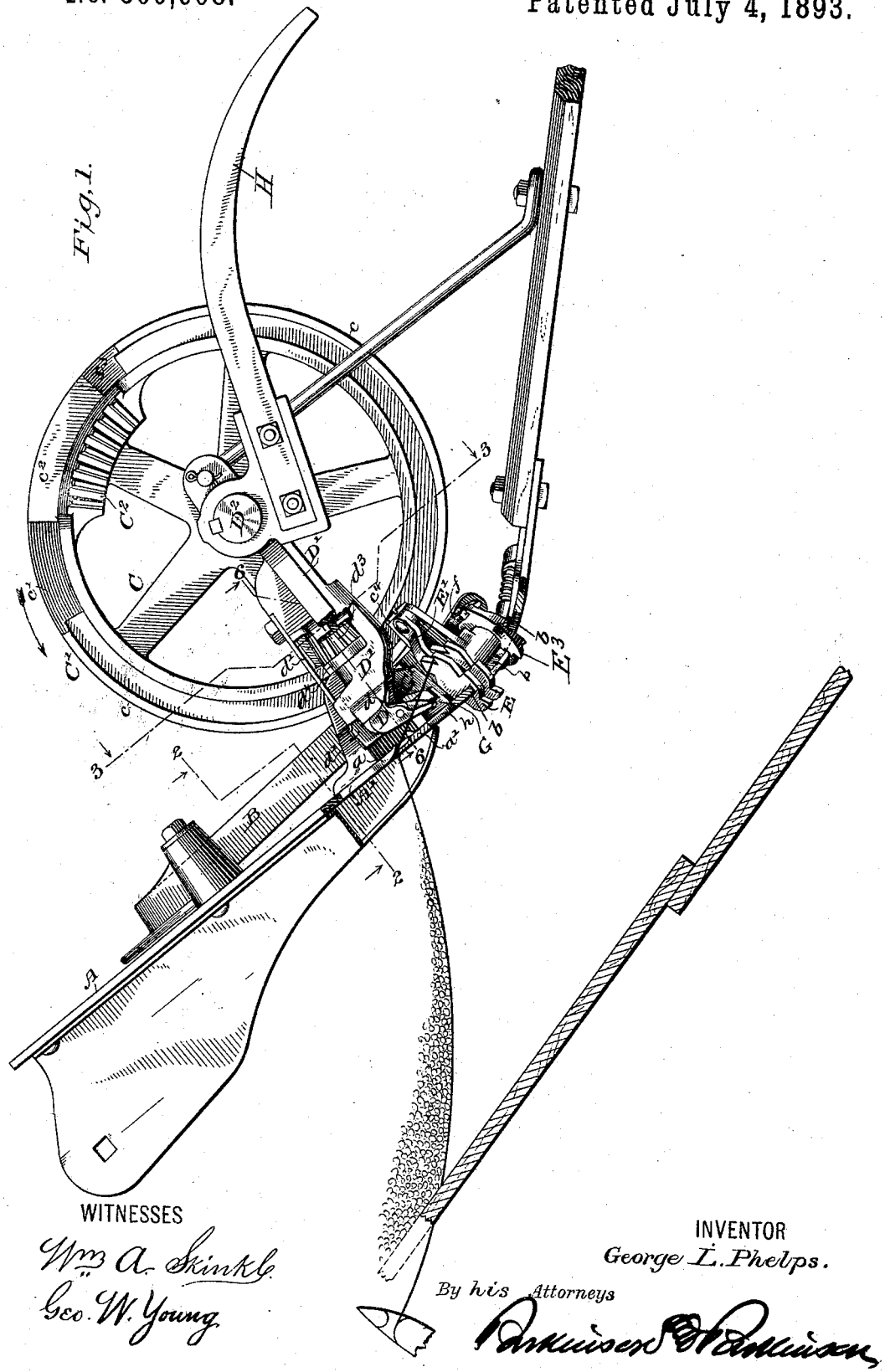

(No Model.) 5 Sheets—Sheet 2.

G. L. PHELPS.
GRAIN BINDER.

No. 500,608. Patented July 4, 1893.

WITNESSES
Wm. A. Skinkle
Geo. W. Young

INVENTOR
George L. Phelps.
By his Attorneys
Parkinson & Parkinson (No Model.) 5 Sheets—Sheet 3.
G. L. PHELPS.
GRAIN BINDER.
No. 500,608. Patented July 4, 1893.
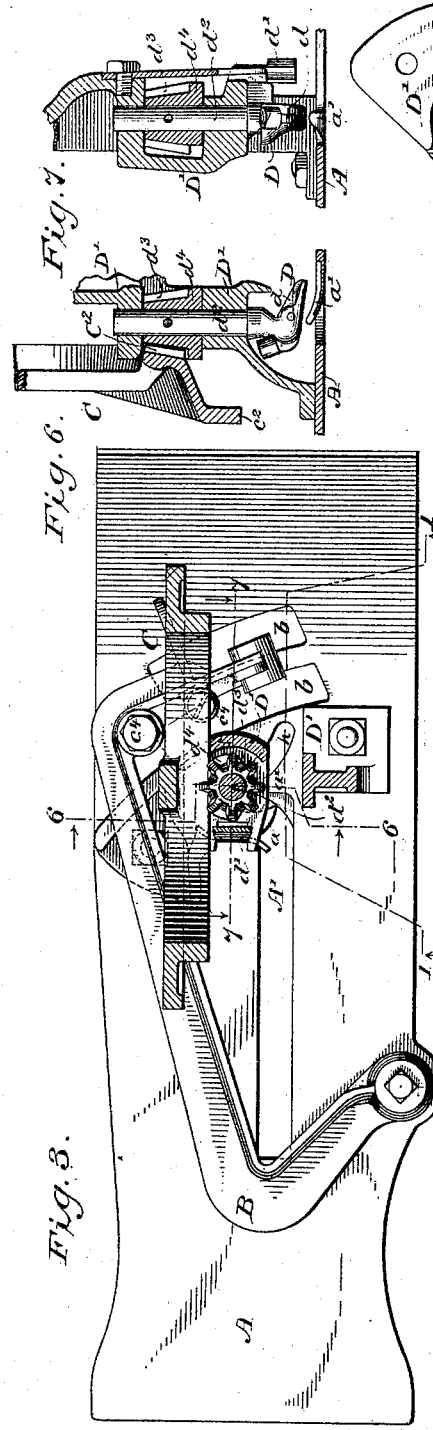
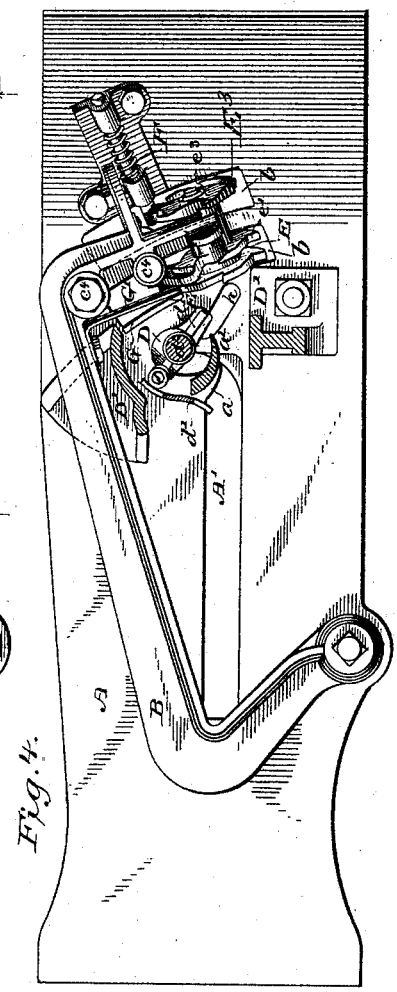
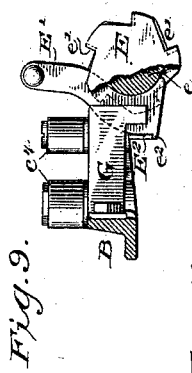
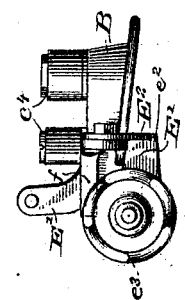
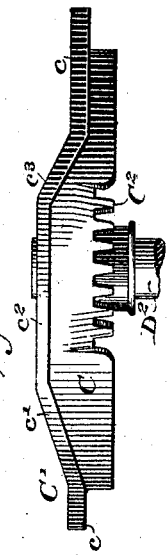
WITNESSES
Wm. A. Skinkle
Geo. W. Young.
INVENTOR
George L. Phelps.
By his Attorneys
Parkinson & Parkinson (No Model.)

G. L. PHELPS.
GRAIN BINDER.

No. 500,608.

Patented July 4, 1893.

WITNESSES
Wm A. Skinkle
Geo. W. Young

INVENTOR
George L. Phelps.
By his Attorneys
Parkinson & Parkinson (No Model.) 5 Sheets—Sheet 5.

G. L. PHELPS.
GRAIN BINDER.

No. 500,608. Patented July 4, 1893.

WITNESSES
Wm. A. Skinkle
Geo. W. Young

INVENTOR
George L. Phelps.

By his Attorneys
Parkinson & Parkinson

UNITED STATES PATENT OFFICE.

GEORGE L. PHELPS, OF CHICAGO, ILLINOIS, ASSIGNOR TO THE McCORMICK HARVESTING MACHINE COMPANY, OF SAME PLACE.

GRAIN-BINDER.

SPECIFICATION forming part of Letters Patent No. 500,608, dated July 4, 1893.

Application filed June 11, 1885. Serial No. 168,328. (No model.) Patented in Canada July 29, 1887, No. 27,309.

*To all whom it may concern:*

Be it known that I, GEORGE L. PHELPS, a citizen of the United States, residing at Chicago, in the county of Cook and State of Illinois, have invented certain new and useful Improvements in Grain-Binders, (for which Letters Patent of the Dominion of Canada were granted me on the 29th day of July, 1887, No. 27,309,) of which the following is a specification.

An application was filed by me in the Patent Office of the United States on the 26th day of December, 1883, Serial No. 115,538, in which I described a construction embodying a peculiar form of the slot in the breast-plate, through which the binder-arm plays, affording a stop-finger adjacent to the knotter to stay the cord laid by the binder-arm and to cause it to be carried laterally during the grasping and knotting actions, and past the end of which the knotter in its revolution slipped said cord. In this construction also the holder was given a lateral movement away from the slot, in the direction of said finger, during the knotting operation, tending to more perfectly fulfill the purposes of the finger, and accelerate the tying of the knot.

My present invention relates to improvements upon the machine described in said application, and it consists, first, in an improved form given to the finger upon which the cord is laid by the binder arm over the end of and beneath which it is deflected or carried by the rotation of the knotter, and also in the form given to that portion of the breast-plate or slot which is adjacent to said finger, whereby certainty in the operation is secured; secondly, in combining with said stop-finger a guard projecting from the opposite side of the slot to direct the cord to the base thereof and to prevent its being sprung back, in mounting the holder in a swinging arm pivoted to the breast-plate near the head of the slot, and at its lower end guided by ways and controlled in its swinging movements by a peripheral cam on the stop-motion gear which rotates the knotter, finally also in certain other improvements and details of construction, hereinafter pointed out and claimed.

Figure 21:
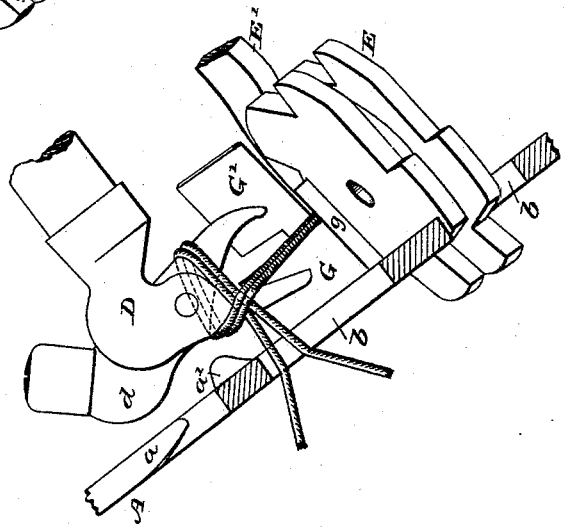
Figure 2:
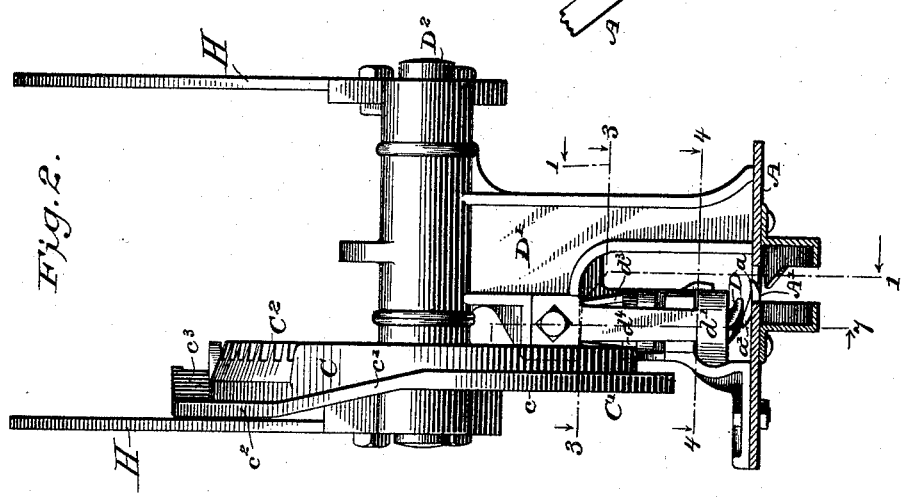
Figure 13:
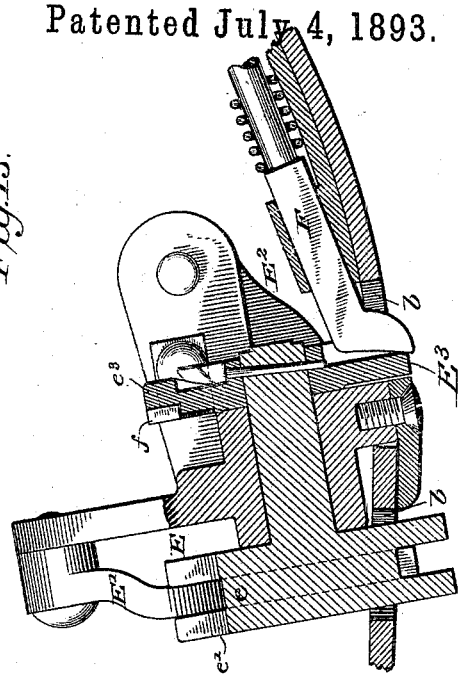
Figure 11:
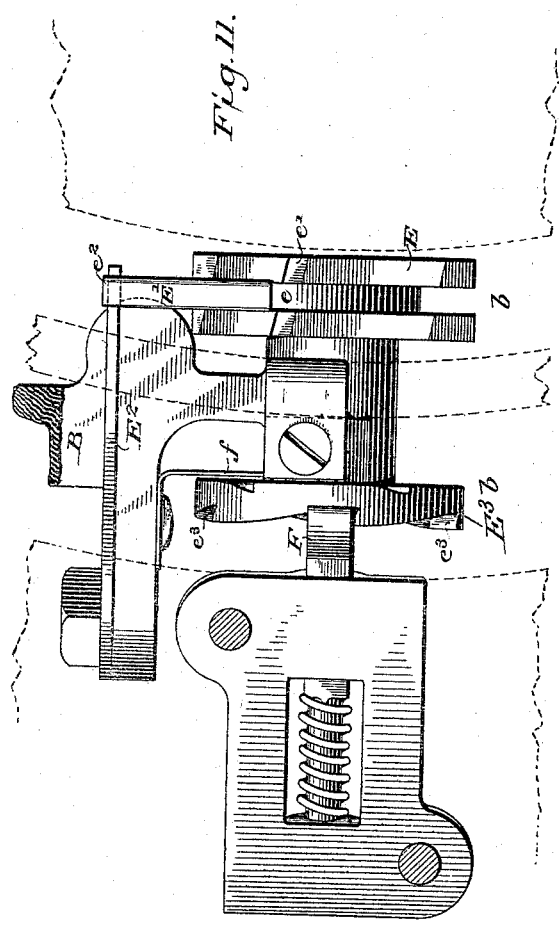
Figure 12:
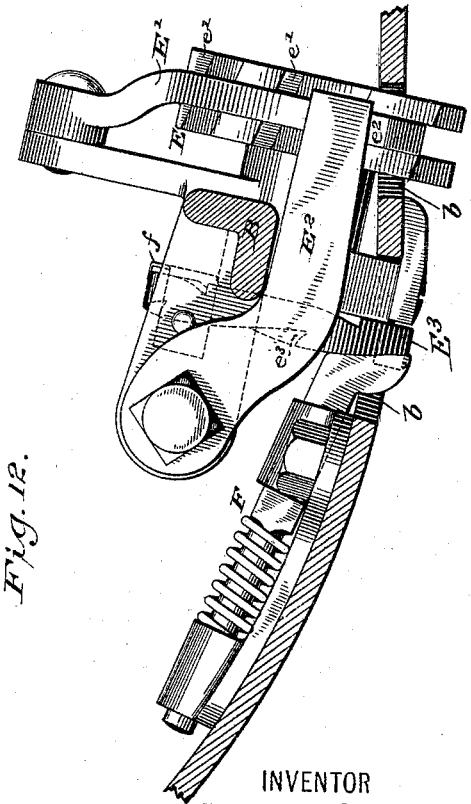
Figure 14:
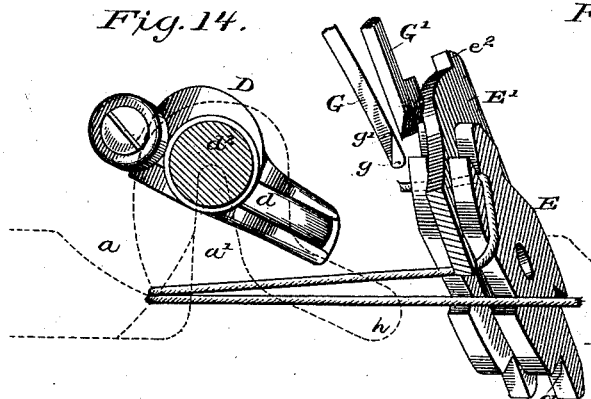
Figure 17:
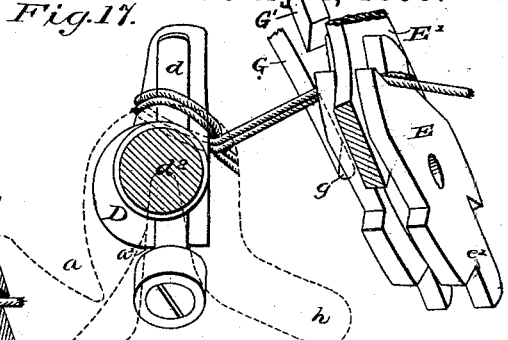
Figure 15:
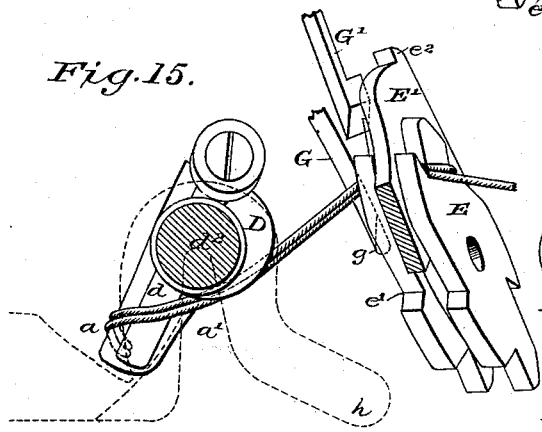
Figure 18:
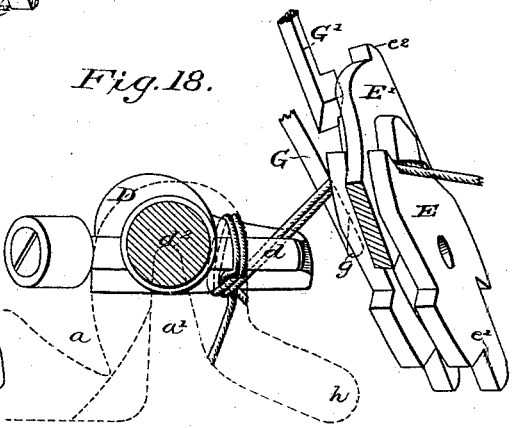
Figure 16:
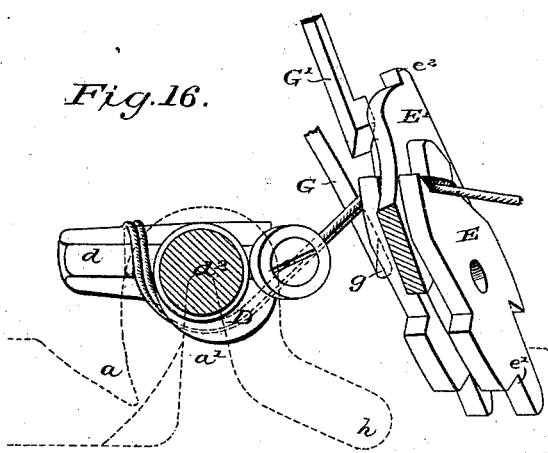
Figure 19:
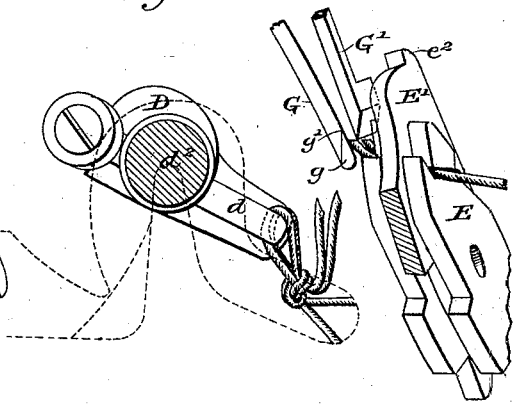

In the drawings: Figure 1 is a rear elevation partly in section on the lines 1, 1, of Figs. 2 and 3 of so much of a grain binder embodying my improvements as is necessary to an understanding thereof. Fig. 2 is an inside elevation thereof partly in section on the line 2, 2, of Fig. 1. Fig. 3 is a plan view partly in horizontal section on the lines 3, 3, of Figs. 1 and 2; Fig. 4 a similar view showing a section on the line 4, 4, of Fig. 2. Fig. 5 is a plan view of the edge of the master-wheel or disk, commonly called the tyer-cam. Fig. 6 is a sectional elevation through the knotter shank and tyer-cam on the line 6, 6, of Fig. 3; Fig. 7, a similar view of the knotter shank and its supports on the line 7, 7, of Figs. 1 and 3. Fig. 8, is an inverted view of the knotter head and its supporting standard. Figs. 9 and 10, are views in sectional elevation showing details of the cord clamping disks and parts adjacent thereto. Fig. 11 is a plan view; and Figs. 12 and 13 sectional elevations on an enlarged scale showing details of the clamping and actuating disks, &c. Figs. 14 to 19 inclusive are diagrammatic plan views and show the relative positions of the parts at successive stages of the knot tying operation, and Figs. 20 and 21, are similar views in elevation.

A is the breast-plate having a slot A', of the form shown, for the passage of the binder-arm to the holder and, at a point which will come just above or in advance of the knotter when in its normal position, a guard-projection $a$ from one side of the slot, directed over nearly to the other side and beveled or inclined on the edge which meets the cord so as to deflect said cord toward and past its end, and direct it upon the base of a stop-finger $a'$, starting from the adjacent side of said slot and reaching thereacross substantially at right angles thereto with its upper or receiving edge in close proximity to and parallel with the lower or contiguous edge of the guard-finger. The point of the guard-finger should be bent up or curved out of the plane of the breast-plate so that after the cord has passed it and reached the stop-finger it may not be accidentally sprung back upon its upper edge but will be confined beneath it and against the stop-finger and permitted only to move along the latter as it is carried by the lateral swing of the holder and revolution of the knotter.

The stop-finger in my former application was flat, that is, it laid in the plane of the breast-plate, and so far as its combination with the guard-finger just described is concerned, it may still be of that form, but as it sometimes happens in the use of this finger that the cord catches against its edge near its extreme end as the knotter revolves, and fails to pass over the end, I deem it more beneficial to also bend or curve this end up slightly from the plane of the breast-plate, or toward the knotter as shown, that the cord may certainly slip past it and enter into the lower part of the slot in said breast-plate toward the close of the knotting operation.

Pivoted to the breast-plate, near its upper end and near the head of the slot, is an arm B which, in order to give a more effective oblique movement at its lower end, has its pivot on that side of the slot opposite to the one at which its lower active end rests, and bends up from this pivot to bridge or clear the end of the slot, so as not to obstruct the play of the binder-arm, then is carried down past the knotter and has its lower end supported and guided in ways $b$ beneath the stop motion gear C, which drives said knotter. Upon the periphery of this gear-wheel is a cam-rib C', which has a straight reach $c$, for a distance corresponding almost in extent with the delay surface on the face of said wheel, and shortly before the commencement of the rack $C^2$ which revolves the knotter, has a lateral jog or deflection $c'$, then becomes straight again at $c^2$ until the end of the rack, when it returns to the original straight reach by a second incline or deflection $c^3$, as shown. This rib enters between two projections or anti-friction rolls $c^4$ rising from the lower end of the swinging arm, and imparts the movements to said arm, holding it stationary until just before the knotter is to be revolved, then pushing it laterally by means of the first deflection until the revolving movement has commenced, then holding it stationary in this lateral position until the revolution is completed, and finally returning it to its original position in close proximity to the slot, by means of the second deflection or incline.

The knotter D is of the ordinary tying-bill form, commonly employed nowadays, having a pivoted jaw $d$ which is opened as usual by a fixed cam on the frame and closed by a spring-cam $d'$ secured to its supporting stock. The spindle $d^2$ of the knotter is supported in said stock or bracket D' extending from the main frame of the binder, which stock also serves as a bearing for the shaft $D^2$ that drives the stop motion gear. A pinion $d^3$ upon the spindle is arranged to be given a single revolution by engagement with the before mentioned rack on the face of said gear opposite the jog in the peripheral cam, and a shoe $d^4$ upon said spindle traveling upon the delay track on the face of the gear, holds the knotter stationary in the intervals between said revolutions, as is customary in these machines.

In the lower end of the swinging arm, outside of the knotter, is mounted a holder composed practically of two disks E connected by a central spool or diaphragm $e$ and notched in their periphery to receive the cord from the binder-arm, preferably with saw-tooth notches $e'$ of the form shown, which catch with greater certainty. Upon the spool or the portion between these disks rests a holder-plate E', or shoe, practically filling said space and pressed down by a strong spring $E^2$, the end of which is prevented from slipping by a lug $e^2$ projecting from the back of the plate. The arrangement of the disks is such that their surfaces are parallel or nearly so with the spindle of the knotter, that is, substantially upright instead of being horizontal. At the same time the position is oblique to the plane in which the band is laid, and trending therefrom inwardly toward said knotter, but this feature is not claimed herein, being made the subject-matter of a claim in Letters Patent of the United States granted me on the 25th day of April, 1893, and numbered 496,096.

Pinned to the spindle which carries the holder-disks, and at convenient distance therefrom is another disk, $E^3$, having ratchet-teeth, $e^3$, formed upon its exterior face, which, when the swinging arm is moved laterally away from the slot, are engaged by a spring-dog F secured to the breast-plate, thereby causing the disks to revolve and carry the cord delivered by the binder-arm underneath the holder-plate, clamping it securely. In the return movement of the holder arm a click $f$ mounted on said arm engages with one of the notches and prevents a retrograde movement of the disks. The oblique and reentering position of the holder-disks relatively to the plane of band-laying and the lateral movement tend, first, to obviate the additional stress upon the cord involved in carrying it directly at right angles to such plane, as customary, and second, to wrap the cord about the knotter and assist in the knotting operation, while the turning movement both aids in such wrapping and also carries the strands of cord down until at the proper moment they are in position to enter the open jaws of said knotter and be grasped thereby.

Between the disks and the knotter is arranged a cord-stop G fast to the breast-plate, which prevents the strands being carried too far down by the rotation of the disks, to enter the jaws of the knotter. The end of this cord-stop adjacent to the slot in the breast-plate is formed with a vertical lug $g$ beveled on the side toward said slot, while presenting a perpendicular face on the other side, armed with a knife blade $g'$, so that the cord held by the disks will ride over the beveled side or edge in the lateral movement of the swinging arm away from the slot, but in the return movement, after the knot has been formed and the ends crossed in the holder, will strike against the perpendicular face, and be stopped, when a knife G' carried by said swinging arm shears against the blade and severs the strands, leaving the knot ready to be pulled from the knotter, and the new end grasped in the holder and leading to the point of the binder-arm. When the knotter is at rest it points obliquely outward across the plane in which the binder-arm plays and in the general direction of the length of the slot, which, at the lower or outer end beyond the stop-finger in the cord-slot, is continued obliquely outward and transversely to said plane, as at $h$, and practically parallel with the jaws of the stationary knotter, to direct the cord as it is wrenched from the jaws by the action of ejecting-fingers, H, secured to the tyer-shaft in the usual manner and so timed that they are brought by its revolution in contact with the sheaf at the moment the knot has been laid and the band ends received, thus causing a practically direct strain upon said knot, notwithstanding the oblique position of the knotter-jaws. By stopping the knotter after its jaws have passed the direct outward line, and when they have become essentially oblique to such line, it grasps the crossed ends much more certainly than if it stopped at a point not so far advanced. It is to be understood, however, that the oblique direction is not intended to be such that the knotter will be wrenched sidewise from the jaws and that the trend outward therefore must be greater than the fore and aft trend, that is to say, it should not exceed forty-five degrees or thereabout from the direct line of discharge.

In operation the binder arm through which the strand of cord retained in the holder after the previous binding operation, runs on its way to the cord box, rises when a gavel is formed, and entering through the slot near the head thereof, moves on until it passes the knotter, which as just stated, in its position of rest, lies pointing obliquely outward along the lower end of the slot, and finally lays the strand which it carries in one of the notches in the holder-disks. The two strands about the gavel will now be rested against the stop-finger to which they have been led by the inclined upper edge of the guard projection. At this moment, the swinging arm begins to be moved laterally by its cam, actuating the holder which grasps the strand just received and renews its grasp upon the old strand, carrying both along to the stop-finger in its own lateral and turning movement. Then the knotter commences to revolve, the holder still moving, but in a moment the swinging arm reaches the shorter straight reach of the cam and comes to rest at the extreme of its movement away from the slot, and the holder therefore ceases to turn. The knotter continues its revolution until it reaches the position from which it started, pointing obliquely outward along the lower end of the slot, as before mentioned, then itself comes to rest, having the cord looped about its jaws and the ends grasped between them and having carried the strands past the end of the stop-finger. Now the swinging arm begins its inward movement toward the slot, causing the strand of cord between the holder and the knotter to be severed by the knife against the stationary shear-block, and the bundle will at once be ejected by the usual revolving arms, pulling the knot forcibly from the tying-bill or knotter and tightening it.

I claim as my invention—

1. The combination substantially as hereinbefore set forth, with the knotter of a breast-plate having a stop-finger in the binder-arm slot extending thereacross and bent upward or toward the knotter out of the plane of the plate.

2. The combination substantially as hereinbefore set forth, with the cord-knotter and the cord-holder, of a breast-plate having a stop-finger extending from one side of the slot, beneath or slightly in advance of the knotter, along which finger the cord is carried or deflected in the revolution of the knotter, and a guard projection from the other side of the slot, which directs the cord upon the base of said finger and retains it thereagainst as it is carried laterally therealong.

3. The combination substantially as hereinbefore set forth, with the cord-knotter and cord-holder, of a breast-plate, provided with a guard projection and a stop-finger in the binder-arm slot extending across said slot opposite to each other, beneath or slightly in advance of the knotter, the first being bent upward or toward the knotter at its end out of the plane of the breast-plate.

4. The combination substantially as hereinbefore set forth, with the knotter and the cord-holder of a breast-plate provided with a guard projection and a stop finger in the binder-arm slot, extending across said slot opposite to each other beneath or slightly in advance of the knotter and both of them bent upward out of the plane of the breast-plate.

5. The combination substantially as hereinbefore set forth, with the knotter and with the laterally moving holder for the cord, which swings away from the binder-arm slot on the side on which the knotter is located, of a guard projection and a stop-finger in said slot beneath or slightly in advance of the knotter, which projection and finger extend from opposite sides of the slot toward each other.

6. The combination substantially as hereinbefore set forth, with the knotter and with a laterally moving holder for the cord which swings away from the binder-arm slot on the side on which the knotter is located, of a guard projection extending from said side of the slot toward the other and beveled or inclined on that edge which meets the cord, and a stop-finger extending from the other side of the slot at right angles thereacross and having its inner or receiving edge parallel with the contiguous or outer edge of the guard finger and in proximity thereto, so that the cord is first deflected upon the base of the stop-finger by the guard-finger, and is subsequently kept in contact with said stop-finger as it is carried therealong by the lateral movement of the holder.

7. The combination, substantially as hereinbefore set forth, with the cord-knotter which stops with its jaws pointing obliquely outward across the plane in which the cord is laid and in the general direction of the length of the slot, of a breast-plate having a slot for the play of the binder-arm, continued beyond said knotter obliquely outward and transversely to said plane, a cord arresting finger projecting from the side of the slot opposite the knotter at the re-entrant angle between the two reaches of the slot and permitting the passage of the cord-strands from the inner to the outer reach while held within the grasp of the holder, and mechanism which gives the knotter a single complete revolution to form the knot and stops it at the end of said revolution with its jaws practically parallel with the obliquely extended reach of the slot so that the pull of the cord as the sheaf is ejected will be guided in a practically straight line from the knotter-jaws.

8. The combination substantially as hereinbefore set forth, with a cord-knotter and cord-holder of a swinging arm pivoted to the shield or breast-plate which guards them, and having the holder mounted in its free end and a cam positively actuating said swinging arm to move it away from and toward the slot in said shield or breast-plate at stated intervals.

9. The combination substantially as hereinbefore set forth with a swinging arm pivoted near the head of the binder-arm slot in the breast-plate and carrying the cord-holder at its free or vibrating end, of a fixed guide or way formed upon or in the breast-plate to steady said free or vibrating end in its movements.

10. The combination substantially as hereinbefore set forth, with the cord-knotter of a swinging arm pivoted to the breast-plate near its head and on the opposite side of the slot through which the binder-arm plays from said knotter, thence extending down alongside the knotter and beneath the gear-wheel which actuates it, a cord-holder mounted in the free end of said arm beyond or outside of the knotter, and a peripheral cam-ledge upon said gear-wheel entering between lugs or rollers upon the swinging arm and actuating it to move away from the cord slot immediately before the knotter comes in mesh with its driving rack and to return it to its normal position adjacent to said slot immediately after said knotter passes out of mesh.

11. The combination substantially as hereinbefore set forth, with the knotter of holder-disks arranged in a plane parallel, or nearly parallel, with the spindle of the knotter, but trending inwardly theretoward from the plane in which the cord is laid, and means whereby said disks are moved laterally past the knotter as it revolves, to bend the cord around it and carry it down into position to be grasped by the jaws.

12. The combination substantially as hereinbefore set forth, of the knotter the swinging arm, the holder-disks supported thereby, in a plane parallel with the knotter spindle, but trending inwardly from the plane in which the band is laid the holder-plate and shoe also supported thereby, the spring dog on the shield or breast-plate, acting upon the ratchet-face of said disks to revolve them as the arm is swung laterally, and the click on said arm, restraining them from movement as the arm is returned to its position.

13. The combination substantially as hereinbefore set forth, with the cord-knotter of the holder-disks, the holder-plate or shoe, the swinging arm or support for said disks and shoe, the beveled lug fixed upon the shield or breast-plate between the knotter and holder, the blade carried by said lug, and the knife on the swinging arm, which severs the cord against said blade on the return movement of the arm.

14. The combination substantially as hereinbefore set forth, with the cord-knotter of the holder-disks, the holder-plate or shoe, the swinging arm or support for said disks and shoe, the cord-stop fixed upon the breast-plate between said disks and the knotter, the shear-blade supported by said cord-stop, and the knife on the swinging arm which severs the cord against said shear-blade on the return movement of the arm.

15. The combination substantially as hereinbefore set forth, with the cord knotter of the holder-disks the holder-plate or shoe, the swinging arm or support for said plate or shoe, the spring-dog which actuates the disks as the arm is swung away from the knotter, the fixed shear-blade between the knotter and holder, and the knife on the swinging arm, which severs the strands of cord against said blade as the arm returns toward the knotter.

16. The combination substantially as hereinbefore set forth, of the breast-plate, the guard projection and stop-finger extending from opposite sides of the slot therein, the tying-bill adjacent to said projection and finger, the stop-motion-gear by which said tying-bill is rotated the swinging arm pivoted near the top of the slot on the side away from the knotter, and thence passing down until its free end comes beneath the stop-motion-gear, the cam-ledge on the periphery of said gear, entering between projections from said arm to positively actuate it back and forth, the rotary cord-holder disks supported in said arm, the spring-dog upon the breast-plate, catching into a ratchet on the face of the outer one of said disks to revolve them as the arm is moved away from the knotter, the click to stop them as it is returned, the fixed shear-blade between the knotter and the holder and the knife on said arm to sever the cord as the arm is swung back and toward the tying bill.

GEORGE L. PHELPS.

Witnesses:
PAUL ARNOLD,
WILLIAM R. BAKER.